Patented Aug. 16, 1949

2,478,984

UNITED STATES PATENT OFFICE 2,478,984

MEDICINAL PREPARATION CONTAINING AVAILABLE CALCIUM AND PHOSPHORUS

Simon L. Ruskin, New York, N. Y., assignor to Frances R. Ruskin

No Drawing. Application July 22, 1944, Serial No. 546,204

4 Claims. (Cl. 167—68)

The present invention relates to medicinal preparations and more particularly to compositions consisting of or capable of yielding double salts of a calcium nucleate and calcium ascorbate.

It is the general object of the invention to provide a therapeutic preparation which is efficient on oral administration to provide both calcium and phosphorus to correct deficiencies in these elements and to improve bone and tooth structure and growth and contributes to improved muscle tone and muscle metabolism.

It is also an object of the invention to provide a therapeutic preparation containing calcium and phosphorus in readily absorbable form and of such solubility that efficient absorption of the medicinal takes place in the alimentary tract.

Other objects of the invention will appear as the following more detailed description of the invention proceeds.

In the usual treatment of calcium-deficiency diseases by the administration of a soluble salt of calcium, it is frequently found that the absorption of calcium is accompanied by a fall of the phosphorus level in the blood. Similarly when absorbable compounds of phosphorus are administered, there is a corresponding diminution in the calcium content of the blood; in short, where the calcium level in the blood is high, the phosphorus level is low, and vice versa. Consequently the intravenous administration of calcium frequently upsets the phosphorus level.

Thus it has been found in the laboratory feeding of rats that rickets is caused as well by Ca-rich, P-poor diets as by Ca-poor, P-rich ones (Raub & Wagner, Arch. Opthal. 1431, 85-102 (1940)).

The only serious attempt to administer both calcium and phosphorus simultaneously is represented by the oral use of calcium phosphate. However, this compound has not proved to be a satisfactory source of calcium and phosphorus because of its poor solubility.

I have found that the calcium salts of the nucleic acids, of both vegetable and animal origin, represent excellent sources for body calcium and phosphorus when they are administered in association with calcium ascorbate which improves their solubility and facilitates their absorption. Preferably the compounds are administered in the form of a double salt; however, the compounds may be administered in the form of a tablet, powder or pill containing the substances in approximately equimolecular proportion, the double salt being then available on solution when the mixture is administered. Especially for the treatment of tooth caries, I have found the addition of small percentages, and even of only a trace, of a soluble fluoride, like sodium, potassium or calcium fluoride, to be very effective in combination with the calcium nucleate and calcium ascorbate.

The double salt may be prepared by dissolving equimolecular proportions of calcium nucleate and calcium ascorbate in water, followed by evaporation and separation of the double salt. The salt may be ground to a pwoder and administered in such form, or the powder may be mixed with a suitable binder like starch, sugar and the like and the mixture molded into tablets, pills, wafers, etc. The fluoride may be added to the solution from which the double salt is crystallized, or it can be added to the dried double salt in suitable proportions. The quantity of fluoride may vary from traces up to about 0.1% of the combined weight of the calcium salts.

I have found that the calcium and phosphorus are absorbed from the double salt above described, or from the equimolecular mixture of the two salts, in approximately normal proportions, that is, in the proportion in which they exist normally in the blood stream, so that both the calcium and phosphorus levels are raised, and the balance neither of the calcium nor of the phosphorus is disturbed. Because of the solubilizing action of the calcium ascorbate, a more efficient absorption of the calcium nucleate is accomplished and thereby an improvement in muscle metabolism and muscle tone and muscle energy is more speedily realized. The vitamin C radical facilitates and increases the utilization of the calcium in bone metabolism and stimulates bone healing which requires additional amounts of phosphorus, which are supplied by the nucleic acid salt. The calcium ascorbate thus promotes greater absorption and effects increased utilization of the calcium and phosphorus in bone growth, and the same applies also to tooth development and growth.

The following example illustrates a satisfactory manner of preparing my improved composition:

Example 39 g. (0.03 mole) yeast nucleic acid were suspended in 100 cc. water and slowly treated under stirring with 120 cc. N sodium hydroxide (0.02 mole). The slightly alkaline solution was brought to neutrality with approximately 1.5 cc. 20% acetic acid, stirred a few minutes with charcoal and then filtered through filter cell. The clear neutral solution was then treated with 50% calcium chloride under stirring until there was no further precipitation of calcium nucleate. Approximately 90 g. are necessary (approximately 0.8 mole). The reaction mixture was then placed in the ice chest over night. The following day the calcium nucleate was separated by centrifugation and washed at least three times with methyl alcohol by centrifugation. Yield 36 g. or 82%.

The product has no definite melting point. Approximately 1.5 g. calcium nucleate dissolve in 100 cc. water. It is insoluble in organic solvents including alcohol. Analysis indicates that the salt is a tetra-calcium salt of the acid.

14.6 g. of the tetra-calcium nucleate (0.01 mole) were stirred with 10 cc. calcium ascorbate syrup containing 1.95 g. calcium ascorbate (0.01 mole). On treating this heavy paste with 100 cc. absolute methyl alcohol followed by 100 cc. ether, a precipitate of calcium nucleate-ascorbate is formed. Yield 16.5 g. With this precipitate, after drying, may be mixed about 0.015 g. of sodium, potassium or calcium fluorides; or the fluoride may be added to the calcium ascorbate syrup and then precipitated simultaneously with the double salt. The double salt may, of course, be separated also by evaporation, but precipitation by means of an organic solvent is preferred.

I claim:

1. A double salt of a calcium nucleate and calcium ascorbate.
2. A composition comprising substantially equimolecular proportions of a calcium nucleate and calcium ascorbate.
3. A composition comprising substantially equimolecular proportions of the calcium salt of yeast nucleic acid and calcium ascorbate.
4. A therapeutic preparation in the form of a tablet containing substantially equimolecular proportions of a calcium nucleate and calcium ascorbate, and a binder.

SIMON L. RUSKIN.

REFERENCES CITED

The following references are of record in the file of this patent:

UNITED STATES PATENTS

| Number | Name | Date |
| --- | --- | --- |
| 2,098,976 | Ruskin | Nov. 16, 1937 |
| 2,115,751 | Ruskin | May 3, 1938 |
| 2,117,777 | Warnat | May 17, 1938 |
| 2,144,830 | Breed | Jan. 24, 1939 |
| 2,159,214 | Klein | May 23, 1939 |
| 2,233,417 | King | Mar. 4, 1941 |

FOREIGN PATENTS

| Number | Country | Date |
| --- | --- | --- |
| 222,716 | Germany | June 10, 1910 |
| 488,784 | Great Britain | July 13, 1938 |

OTHER REFERENCES

Lukomsky, Journal of Dental Research, Dec. 1941, pages 649–659.

Perry, J. Nutrition, Jan. 1941, pages 35 to 43.

Armstrong, Journal of Dental Research (1938), vol. 17, pages 393–9.